(12) United States Patent
Fraundorfer

(10) Patent No.: US 10,086,664 B2
(45) Date of Patent: Oct. 2, 2018

(54) FLOATABLE LAND VEHICLE

(71) Applicant: General Dynamics European Land Systems-Germany GmbH, Kaiserslautern (DE)

(72) Inventor: Werner Fraundorfer, Weilerbach (DE)

(73) Assignee: General Dynamics European Land Systems—Germany GmbH, Kaiserslautern (DE)

( * ) Notice: Subject to any disclaimer, the term of this patent is extended or adjusted under 35 U.S.C. 154(b) by 0 days.

(21) Appl. No.: 14/817,420

(22) Filed: Aug. 4, 2015

(65) Prior Publication Data

US 2016/0031276 A1 Feb. 4, 2016

(30) Foreign Application Priority Data

Aug. 4, 2014 (DE) .................. 10 2014 011 305

(51) Int. Cl.
| | |
|---|---|
| *B60F 3/00* | (2006.01) |
| *F02M 37/00* | (2006.01) |
| *B60K 15/063* | (2006.01) |
| *B63B 43/14* | (2006.01) |

(52) U.S. Cl.
CPC .......... *B60F 3/0038* (2013.01); *B60F 3/0023* (2013.01); *B60F 3/0053* (2013.01); *B60K 15/063* (2013.01); *F02M 37/0076* (2013.01); *B60F 3/0007* (2013.01); *B60F 3/0061* (2013.01); *B60K 2015/0639* (2013.01); *B60Y 2200/42* (2013.01); *B63B 43/14* (2013.01)

(58) Field of Classification Search
CPC ... B63B 43/10; B63B 43/14; B63B 2043/145; B60F 3/0061; B60F 3/0038; B60F 3/003
See application file for complete search history.

(56) References Cited

U.S. PATENT DOCUMENTS

| | | | | |
|---|---|---|---|---|
| 2,049,702 | A | | 8/1936 | Howe |
| 3,099,977 | A | * | 8/1963 | McLarty ............... B60F 3/0092 114/344 |
| 3,382,836 | A | * | 5/1968 | Hume ................... B60F 3/0038 440/12.53 |
| 3,043,745 | A | | 10/1968 | Commons |
| 6,101,964 | A | * | 8/2000 | Lesesne ................. B63B 25/12 114/256 |
| 6,626,712 | B1 | * | 9/2003 | Bellezza Quater ... B60F 3/0007 440/12.51 |

FOREIGN PATENT DOCUMENTS

| | | |
|---|---|---|
| DE | 2 122 923 | 11/1972 |
| DE | 38 32 559 C1 | 2/1990 |
| DE | 20 2013 010 491 U1 | 3/2014 |
| EP | 1 547 829 A2 | 6/2005 |

* cited by examiner

*Primary Examiner* — Andrew Polay
(74) *Attorney, Agent, or Firm* — Muncy, Geissler, Olds & Lowe, P.C.

(57) ABSTRACT

A floatable land vehicle is provided that includes a base body having at least one buoyancy body that is detachably fastened to the base body, the buoyancy body containing an at least partially filled tank.

11 Claims, 1 Drawing Sheet

FLOATABLE LAND VEHICLE

This nonprovisional application claims priority to German Patent Application No. 10 2014 011 305.1, filed on Aug. 4, 2014, all of which is herein incorporated by reference.

BACKGROUND OF THE INVENTION

Field of the Invention

The present invention relates to a floatable land vehicle.

Description of the Background Art

A floatable land vehicle can be understood to be vehicles such as wheeled or continuous-track vehicles, which are usually used on land but which do not sink in water. They are, for example, amphibious vehicles, in particular amphibious combat vehicles.

If necessary, land vehicles are transported to a desired operational area by ship for humanitarian or military purposes. However, the problem frequently arises that the ship which transports the land vehicles to the desired operational area is unable to dock on shore, so that the land vehicles must be brought from the ship to the shore. Floatable land vehicles have proven to be successful, which may be launched directly into the water and then driven to land.

Particularly when there are great distances between the ship and shore, the floatable land vehicle requires a high degree of floating stability, since external conditions, such as water flow and wind, may change unpredictably between the ship and the shore.

SUMMARY OF THE INVENTION

It is therefore an object of the present invention to improve the floating stability of floatable land vehicles.

Another object of the present invention is to improve the speed of the floatable land vehicles in water and the range of the floatable land vehicles in water and on land.

An improvement of the floating stability is achieved according to the invention in that a floatable land vehicle having a base body comprises at least one buoyancy body which is detachably fastened to the base body, the buoyancy body containing an at least partially filled tank.

The at least one buoyancy body having an at least partially filled tank brings about an improvement in the position of the floatable land vehicle in the water, so that the floatable land vehicle continues to sit securely in the water even in the event of changing external circumstances, such as changing flow or wind.

The tank preferably contains fuel, which may be transferred to the vehicle tank of the floatable land vehicle after the floatable land vehicle has reached land, so that the vehicle is immediately operational on land.

The floatable land vehicle furthermore includes a fuel supply system, and the at least partially filled tank of the buoyancy body is connectable to the fuel supply system of the floatable land vehicle. The fuel present in the buoyancy bodies may thus be used during the transfer of the floatable land vehicle from the ship to the shore. After the floatable land vehicles have come ashore, the buoyancy bodies may be removed, and the floatable land vehicle is immediately ready for deployment with a full tank. The range of the floatable land vehicle is hereby significantly increased both in water and on land.

In one advantageous specific embodiment, the buoyancy body comprises a propulsion unit, so that floatable land vehicles can also operate in the water without a separate ship propulsion unit.

The propulsion unit may be, for example, an outboard motor, a jet propulsion unit or a pump-jet propulsion unit.

It is furthermore preferred that the at least partially filled tank of the buoyancy body contains fuel and is connected to the propulsion unit. The propulsion unit is not dependent on the fuel present in the floatable land vehicle and may thereby be operated independently of the floatable land vehicle.

The propulsion unit preferably has its own control system, which is controllable, for example, with the aid of an operating unit situated in the base body. This has the advantage that the buoyancy body, which is detachably fastened to the base body, may be flexibly deployed in a large number of different floatable land vehicles.

It is furthermore preferred that the floatable land vehicle comprises a large number of buoyancy bodies, the buoyancy bodies being disposed on the outside of the base body, and the arrangement of the buoyancy bodies being selected in such a way that the base body sits in the water in a flotation-stable manner. For example, a buoyancy body may be disposed on two opposite sides of the base body. The large number of buoyancy bodies and the arrangements of the buoyancy bodies optimized with respect to flotation stability further improve the flotation stability of the floatable land vehicle.

The buoyancy bodies described may be attached to a land vehicle with and without a ship propulsion unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
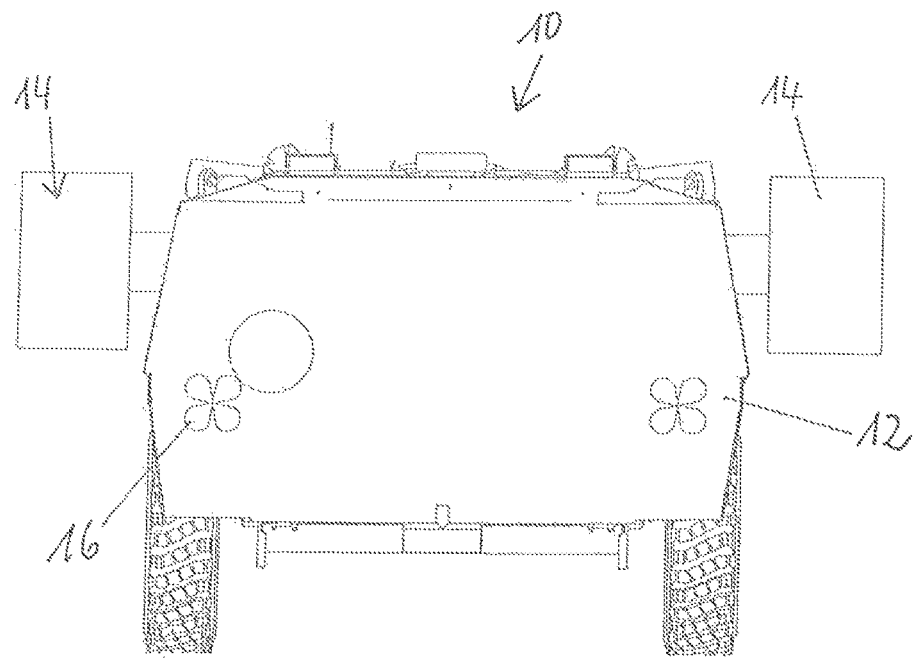
FIG. 1 shows the back of a floatable land vehicle, including two buoyancy bodies, according to a first specific embodiment.

FIG. 1 shows a floating land vehicle 10, which includes a base body 12, to which two buoyancy bodies 14 are detachably fastened. The two buoyancy bodies 14 are disposed on the outside of base body 2 on two opposite sides of base body 12, transversely to the direction of travel of floatable land vehicle 10.

Floatable land vehicle 10 is a wheeled vehicle, in particular an amphibious combat vehicle. Alternatively, the floatable land vehicle may be a continuous-track vehicle.

Floatable land vehicle 10 comprises its own ship propulsion unit 16.

The buoyancy bodies each contain a tank, which is at least partially filled with fuel. The tank is preferably completely filled with fuel. The buoyancy body is, for example, a hollow body which includes a tank in its interior.

The tank of the buoyancy body is connected to a fuel supply system of floatable land vehicle 10 over a line, which is not illustrated, for the purpose of supplying fuel to the fuel supply system of floatable land vehicle 10. The line connected to the tank in the buoyancy body empties, for example, into the vehicle tank of floatable land vehicle 10 or into a line section of the fuel supply system behind the vehicle tank in the flow direction of the fuel.

Before floatable land vehicle 10 is launched from a ship into the water for the purpose of being transferred to a shore, buoyancy bodies 14 are detachably fastened to base body 12 of floatable land vehicle 10, for example to its vehicle body. The two tanks of the two buoyancy bodies 14 are furthermore connected to the fuel supply system of land vehicle 10 over lines.

As soon as floatable land vehicle 10 equipped with buoyancy bodies is situated in the water, it is driven by ship propulsion unit 16 in order to reach land. The supply of fuel to ship propulsion unit 16 takes place via the two tanks in the two buoyancy bodies 14. The range of floatable land vehicle 10 is thus adjustable by means of the quantity of fuel carried in the buoyancy bodies.

Buoyancy bodies 14, including the at least partially filled tank on the outsides of base body 12 of floatable land vehicle 10, result in an improvement in the flotation stability in water.

Once floatable land vehicle 10 has reached land, buoyancy bodies 14 may be removed from floatable land vehicle 10. Since the fuel in the vehicle tank of floatable land vehicle 10 was not needed for transferring floatable land vehicle 10 from the ship to the shore, a vehicle having a full tank and a long range is available for use after landing.

Figure 2:
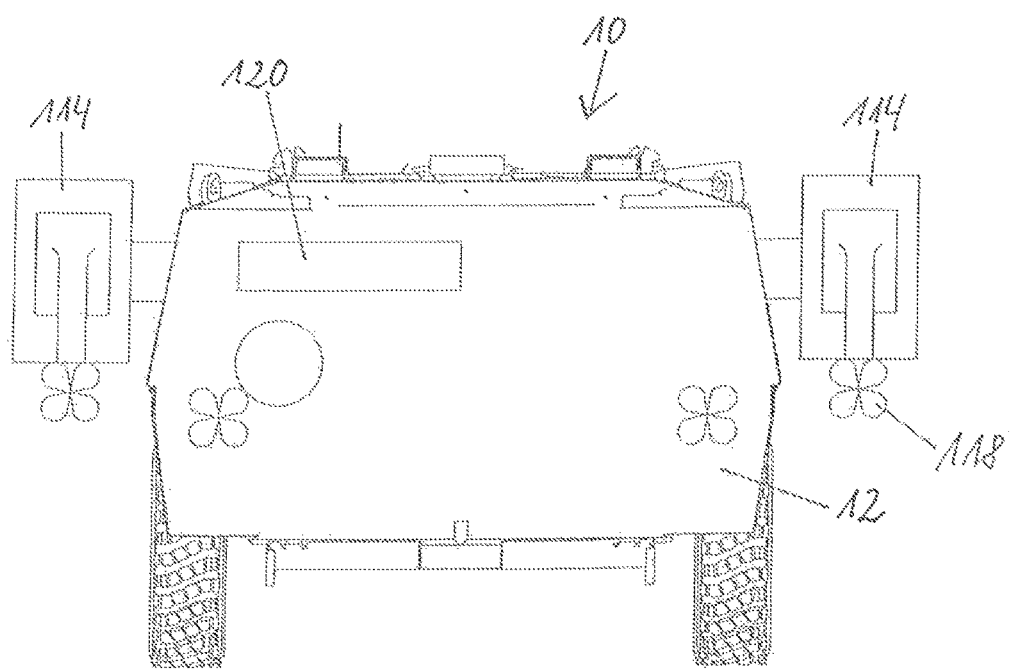
FIG. 2 shows a floatable land vehicle, including two buoyancy bodies, according to a second specific embodiment.

In the second specific embodiment of a floatable land vehicle 10 illustrated in FIG. 2, each buoyancy body 114 comprises both a tank and its own propulsion unit 118. Each propulsion unit 118, for example an outboard motor, a jet propulsion unit or a pump-jet propulsion unit, has its own control system, an operating unit 120 for propulsion unit 118 in buoyancy body 114 being disposed in base body 12 of floatable land vehicle 10. Each propulsion unit 118 is therefore controllable at least individually or, if desired, also coupled with other propulsion units 118.

Buoyancy body 114 may be designed as a hollow body, in whose interior the tank is situated and which accommodates at least one part of propulsion unit 118.

The tank in buoyancy body 114 is connected to propulsion unit 118 and supplies the latter with fuel.

In addition, a line is provided between the tank in buoyancy body 114 and the fuel supply system of floatable land vehicle 10 for the purpose of supplying ship propulsion unit 16 with fuel.

Before floatable land vehicle 10 is launched into a body of water from a ship, it is provided with buoyancy bodies 114, which are fastened, for example, to the vehicle body of the floatable land vehicle. The two tanks of the two buoyancy bodies 114 are furthermore connected to the fuel supply system of land vehicle 10 over lines.

Floatable land vehicle 10 is driven with the aid of ship propulsion unit 16 and propulsion unit 118 of buoyancy bodies 114 so that it may reach the shore.

As described in the specific embodiment illustrated in FIG. 1, buoyancy bodies 114 result in an improve flotation stability of floatable land vehicle 10. Additional propulsion unit 118 on buoyancy bodies 114 cause an increase in the speed of floatable land vehicle 10 in the water.

Once floatable land vehicle 10 has reached land, buoyancy bodies 114 may be removed from land vehicle 10. Since the fuel in the vehicle tank of floatable land vehicle 10 was not needed for transferring floatable land vehicle 10 from the ship to the shore, a vehicle having a full tank and a long range is available for use after landing.

In FIGS. 1 and 2, buoyancy bodies 14 and 114, respectively, are illustrated in connection with a floatable land vehicle 10, which has its own ship propulsion unit 16.

According to one specific embodiment, which is not shown, buoyancy body 114, including propulsion unit 116, may also be attached to a floatable land vehicle which does not have a ship propulsion unit of its own. In this specific embodiment, the floatable land vehicle is driven with the aid of the propulsion unit of the buoyancy body. In this case, there is no need to connect the tank to the fuel supply system of the floatable land vehicle.

In another specific embodiment, which is not illustrated, a floatable land vehicle having its own ship propulsion unit is driven exclusively via the propulsion units of the buoyancy bodies, so that, in this specific embodiment as well, no line connection between the tank in the buoyancy body and the fuel supply system of the floatable land vehicle is required.

In the specific embodiments shown, two buoyancy bodies are provided on the base body of the floatable land vehicle. The number and arrangement of the buoyancy bodies along the base body may be arbitrarily selected, and they are designed to improve the flotation stability of the floatable land vehicle.

Within the scope of the invention with fuel, any combination of filled buoyancy bodies, unfilled buoyancy bodies and buoyancy bodies having propulsion units may be provided in an arrangement around a floatable land vehicle.

In the specific embodiments described up to now, it was assumed that fuel is present in the vehicle tank of the floatable land vehicle, preferably the vehicle tank is completely filled with fuel. However, the invention may also be used in floatable land vehicles, in which the vehicle tank is empty or is at least not completely filled. In this case, incompletely consumed fuel in the tanks of the buoyancy bodies may be transferred to vehicle tanks after landing. In addition, buoyancy bodies containing fuel may be carried, which are not needed for transferring the floatable land vehicle from the ship to a shore and the fuel tanks may be filled after landing. In this manner, an operational vehicle is also available after it is transferred from the ship to land.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A floatable land vehicle comprising:
   a vehicle body;
   a plurality of buoyancy bodies detachably fastened to an outside of the vehicle body, the plurality of buoyancy bodies each containing an at least partially filled fuel tank and configured to apply buoyancy force to the vehicle body; and
   a fuel supply system, the at least partially filled fuel tank of the plurality of buoyancy bodies being connectable to the fuel supply system of the floatable land vehicle for supplying fuel to the fuel supply system of the floatable land vehicle,
   wherein the floatable land vehicle is a motor-driven land vehicle having a drive unit within the vehicle body for driving on land.

2. The floatable land vehicle according to claim 1, wherein the at least partially filled fuel tank contains fuel.

3. The floatable land vehicle according to claim 1, wherein the plurality of buoyancy bodies comprises a propulsion unit.

4. The floatable land vehicle according to claim 3, wherein the at least partially filled fuel tank of each of the plurality of buoyancy bodies contains fuel and is connected to the propulsion unit.

5. The floatable land vehicle according to claim 3, wherein the propulsion unit has its own control system.

6. The floatable land vehicle according to claim 3, wherein the propulsion unit is an outboard motor, a jet propulsion unit or a pump jet.

7. The floatable land vehicle according to claim 1, wherein the floatable land vehicle includes its own ship propulsion unit.

8. The floatable land vehicle according to claim 1, wherein the floatable land vehicle is an amphibious combat vehicle.

9. A floatable land vehicle comprising:
a vehicle body;
a drive unit within the vehicle body for driving on land;
a plurality of buoyancy bodies detachably fastened to opposite sides of the vehicle body, each buoyancy body containing a fuel tank containing fuel, wherein the plurality of buoyancy bodies are configured to apply buoyancy force to the vehicle body; and
a fuel supply system, the at least partially filled tank of the plurality of buoyancy bodies being connectable to the fuel supply system of the floatable land vehicle.

10. The floatable land vehicle according to claim 1, wherein a quantity of fuel carried in the plurality of buoyancy bodies is adjustable to regulate a range of the floatable land vehicle.

11. The floatable land vehicle according to claim 1, wherein the plurality of buoyancy bodies is detachably fastened directly to the vehicle body.

* * * * *